United States Patent [19]
Wieder

[11] 3,747,020
[45] July 17, 1973

[54] POLARIZATION JUNCTION LASER
[75] Inventor: Harold Wieder, Saratoga, Calif.
[73] Assignee: International Business Machines Corporation, Armonk, N.Y.
[22] Filed: Nov. 26, 1971
[21] Appl. No.: 202,431

[52] U.S. Cl. .... 331/94.5 C, 317/235 R, 331/94.5 H
[51] Int. Cl. ............................................. H01s 3/00
[58] Field of Search ................... 331/94.5; 317/235

[56] References Cited
UNITED STATES PATENTS
| | | | |
|---|---|---|---|
| 3,283,262 | 11/1966 | Marcatili | 331/94.5 C |
| 3,311,846 | 3/1967 | Simpson et al. | 331/94.5 |
| 3,531,735 | 9/1970 | Collins et al. | 331/94.5 |
| 3,295,911 | 1/1967 | Ashkin et al. | 350/150 |

OTHER PUBLICATIONS
Mohn et al., "Operation of a Gallium Arsenide Diode Laser with an External Resonator using a Brewster Window," Physics Letter, Vol. 24A, pp. 561–562, May 22, 1967.

Primary Examiner—Edward S. Bauer
Attorney—Melvyn D. Silver et al.

[57] ABSTRACT

In a junction laser, the improvement is in providing a structure which inherently generates a preferred polarization enhancement. This comprises directing the light beams generated by at least a first and second laser element across a common Brewster angle surface separating the laser elements, while maintaining the external non-common faces of the laser elements parallel to form a Fabry-Perot resonator. Included is a structure and method description and application of the device.

24 Claims, 2 Drawing Figures

PATENTED JUL 17 1973 3,747,020

POLARIZATION JUNCTION LASER

FIELD OF THE INVENTION

Lasing elements in general and solid state junction lasers in particular, especially junction lasers adapted to generate a polarized light beam.

PRIOR ART

Where it has been desired in the prior art to generate a polarized light beam from a junction laser, this has generally entailed the use of both a light source and specific polarizing elements or else a device which is bulky, inefficient, and difficult to align. Either of these approaches result in the following problems:

1. Large light losses
2. Large space requirements
3. Alignment problems
4. Significant diffraction losses.

Further, maintenance of such systems is expensive, and because of the light losses involved, the laser power outputs required may be higher than desirable. This in turn requires cooling devices necessary to operate the systems efficiently, adding additional cost and space. In general, however, junction lasers have advantages over gas lasers in being smaller in size and requiring less power. Thus, it is an object of this invention to obtain a polarized beam in a junction laser.

A further object is to obtain a polarized beam in a junction laser without the use of external polarizing means.

Further, it is an object of this invention to build the above laser from materials including a gallium arsenide, gallium phosphide, and gallium aluminum arsenide.

Another object of this invention is to generate a polarized beam in a junction laser economically, and to obtain a process for generating such a polarized beam in an efficient manner.

Still another object of the invention is to maintain an option for inherently utilizing a Q-switch in conjunction with the polarized beam, while maintaining the inherent structure of the device.

Still another object is to be able to generate any of the above in a small space.

Still another object is to obtain the ability to generate a multi-channel polarized set of beams having a common polarization plane, from a laser array and to further have the option of utilizing the laser with or without a Q-spoiler as desired.

Still a further object of this invention is to utilize such a junction laser in a method of reading data in conjunction with a medium exerting a polarization rotation effect upon a polarized beam.

SUMMARY OF THE INVENTION

These and other objects of this invention are met by the junction laser described and the methods of generating the polarized beam also described. The junction laser involved comprises at least first and second lasing elements having substantially the same index of refraction. These lasing elements are spaced from each other and inclined at a common Brewster angle, with the non-common external faces of the elements inclined parallel to each other to form a Fabry-Perot resonator. Further, means for applying current to the lasing elements to cause light generation is included. Thus, by directing the light beams generated by at least the first and second lasing elements across a common Brewster angle surface separating the lasing elements while maintaining the external non-common faces of the lasing elements parallel to each other to form a Fabry-Perot resonator, a great enhancement of the plane of polarization in the plane of incidence of the Brewster surface is obtained, resulting in essentially a plane polarized beam from the laser.

Specific embodiments and the more general concept of the invention will best be understood in conjunction with the following drawings and general descriptions.

IN THE DRAWINGS

GENERAL DESCRIPTION

This invention will best be understood with reference to the drawings.

Figure 1:
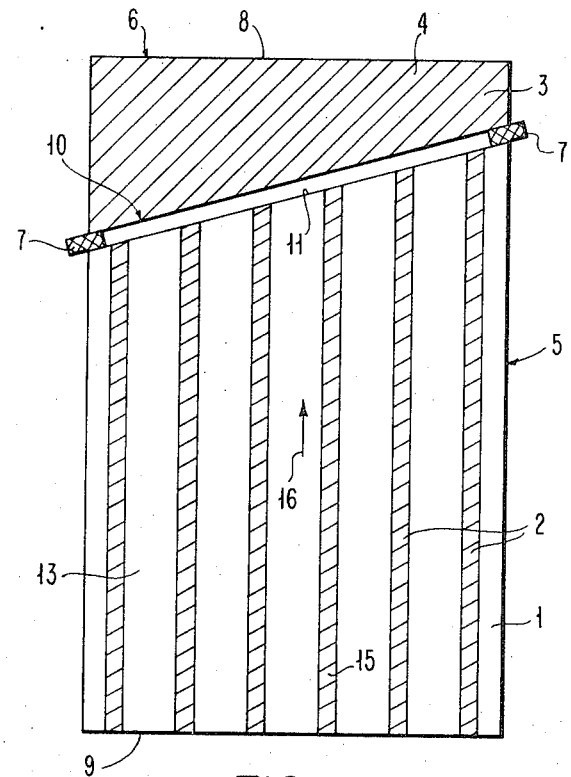
FIG. 1 depicts one embodiment of the multi-channel lasing device of this invention utilizing two separate lasing elements.

In FIG. 1 is shown a lasing device of this invention. While the device will be described in specific terms, specifically in terms of a gallium arsenide junction laser, it will be evident to those skilled in the art that other junction lasers may also be utilized in place of gallium arsenide for achieving the same effect.

FIG. 1 shows a multi-channel junction laser comprising a base of N-type gallium arsenide 1 with a series of P-regions 2 diffused therein. There is yet another region 3 of P-type gallium arsenide covering the entire surface and diffused upon a base layer 4 of N-type gallium arsenide. The depth of the junctions are chosen to be at the same depth for both lasing elements 5 and 6. Lasing elements 5 and 6 are spaced by spacers 7 at the Brewster angle between the two components. Where gallium arsenide is used the Brewster angle is approximately 15°. Surfaces 8 and 9 of the two lasing elements 5 and 6 are chosen to be parallel to each other to ultimately form a Fabry-Perot resonator. These surfaces 8 and 9 are generally cleaved, but they may instead by polished, and may further include mirrored layers, such as partially reflecting deposited mirrors. These would include silver or aluminum films or other materials, including multilayer dielectrics, which would provide high reflectivity. The internal surfaces 10 and 11 of lasing elements 6 and 5, respectively, should desirably be polished.

The invention will now be described in operation. While a multiplicity of channels 2 is shown in the device, the invention will be described in terms of a single channel, which is all that is necessary for the device to function. The multiplicity of channels 2 is shown for convenience to show the versatility of the invention. Further, means for pulsing the laser are not shown, as they are known in the art.

In operation both elements of the laser are pulsed simultaneously either by a common set of current applying means, or through individual current applying means operating synchronously. Light generated for example in channel 15 will have a certain amount of emission through surface 9. The light emitting from surface 9 contains components in and perpendicular to the plane of incidence. The light leaving this channel from surface 9 is not polarized in any particular direction.

However, light from channel 15 traveling in the direction indicated by arrow 16 travels toward a Brewster angle surface. As stated earlier, the Brewster angle for gallium arsenide is approximately 15°. Consequently, at the Brewster angle as is well known in the art the component of the beam in the plane of incidence is totally transmitted through the surface. On the other hand, there is a significant amount of reflection of the other component, that is, the component perpendicular to the plane of incidence. Thus, a significant amount of that light is reflected back into element 5 and is absorbed within that element. The light passing through the Brewster surface 11 promptly encounters lasing element 6, where it enters lasing element 6 and is reflected from surface 8 back to the Brewster surface 10 where it then re-enters channel 15. Each time the light passes through either of the Brewster surfaces, more and more of the perpendicular component is absorbed into the lasing elements 5 and 6, resulting in a great enhancement of the component of polarization in the plane of incidence compared to the component of polarization perpendicular to the plane of incidence. What is seen in the emitted beam either through surface 8 or through surface 9 is an essentially polarized beam having a component only in the plane of incidence, since the lasing process allows only the stronger of two mutally perpendicular modes wihin a single resonator to be propagated.

Both elements of the laser must be pulsed simultaneously, resulting in a reinforcement effect, with light entering channel 15 in both directions. The same is true for lasing element 6. For each round trip of the laser beam, the Brewster surface is traversed four times. Thus, in the time required for a mode to be established in the laser, the component of polarization in the plane of incidence will be so strongly favored that it will represent the overwhelmingly dominant mode of the system and the light emitted from the laser will be essentially polarized.

The spacing between the two lasing elements must be seen as to permit the Brewster effect to occur. If the two elements are too close to each other, such as less than a wavelength apart, the beam will simply pass straight through from one element to the other without undergoing the Brewster angle effect of enhancing the transmission of one component with respect to the other. If the elements are too far apart, such as tens of wavelengths, diffraction losses in the spacing may be severe. The exact spacing is determined as a tradeoff between the desired polarization enhancement and the tolerable diffraction loss. It is preferred that the spacing between lasing element 5 and 6 be approximately two to five wavelengths as an optimum tradeoff between losses and a practical working distance.

It should be noted that this device can be fabricated with a minimum of alignment difficulties by constructing both components of the laser from a single crystal which has been cleaved on one end and polished at the Brewster angle on the other. The single piece can then be sawed into two parts and if a spacer is then inserted between the Brewster faces, the exterior cleaved faces will automatically be parallel. The channel is typically 1-10 mils wide in a lasing element having a length of 10-15 mils and an equal thickness, although these dimensions can vary widely.

It is important to note that smooth surfaces can be obtained by cleavage, for surfaces 8 and 9, and that, should mirrors be utilized concurrently with the channel arrangement as shown in laser 5, a dielectric layer must first be placed over surface 9 to prevent shorting between the individual channels. Again, it must be stated that while the multiplicity of channels is shown, the device will function as a single channel device. In effect, lasing element 5 can be exactly as lasing element 6 without the plurality of channels shown in 5, resulting in a wider beam emitting surface 9 but with the same polarization enhancement effect being present. By the same token, element 6 and element 5 can both be constructed with multiple channels, in which case less power is required to operate each laser channel.

Figure 2:
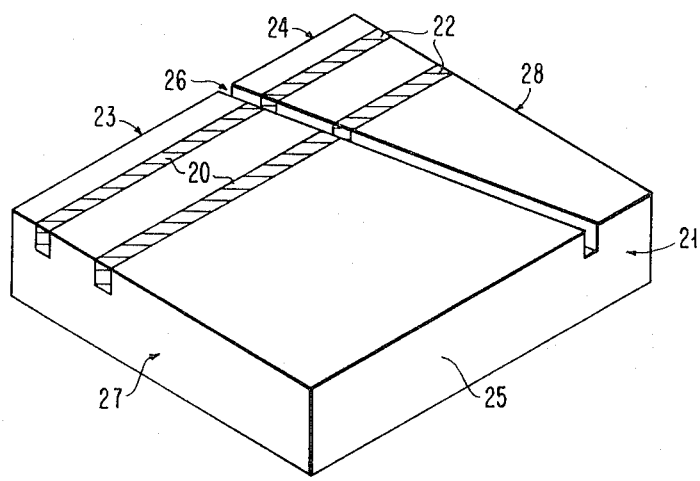
FIG. 2 shows another embodiment of a multi-channel lasing device of this invention utilizing a single lasing element divided into two lasing junction elements having a common base.

FIG. 2 shows an alternative embodiment of this invention. Shown again are a plurality of channels 20, 22 in a common base 21. Here the lasing elements are defined as lasing elements 23 and 24 having a common base area 25. The common base occurs by utilizing a single gallium arsenide laser, for example, and making a Brewster angle cut 26 in the device to separate the device into two regions which then comprise lasing elements 23 and 24. By utilizing this method, of course, the device is very economical to make, the depth of the diffusions are identical, and alignment between channels 22 and 20 is automatic. While a certain refraction effect occurs to offset the beam in passing across Brewster space 26, this is relatively negligible. In all other means the device in FIG. 2 is the same as the device in FIG. 1. That is, the surfaces 27 and 28 must be parallel, they may or may not be mirrored or partially reflecting as desired, and the light can be made to be emitted from either side. As in FIG. 1, the means for applying current to the lasing element to cause light generation is not shown. The Brewster angle spacing 26 of FIG. 2 may be made in a variety of ways. A fine saw cut may be utilized, or laser beam drilling or machining, or electron beam cutting all will make a proper cut. It is desirable to avoid a roughening surface effect which has the effect on a minute scale of changing the Brewster angle at a particular point. This may be avoided by using a filler in the Brewster angle spacing.

A further embodiment of this invention utilizes a particular filler in the spaces between the two lasing elements. A particular filler would be a Q-spoiler, which is known in the art. One particular Q-switch material is described in copending application Ser. No. 236,514, filed Mar. 20, 1972, a continuation of application Ser. No. 75,601, filed Sept. 25, 1979, entitled "Q-Switching Saturable Absorber Dye for a Laser," and assigned to the same assignee as this invention. Other Q-switch materials are known in th arts.

Still another embodiment involves two different lasing elements. Referring again to FIG. 1, element 6 may be a material such as gallium arsenide and element 5 may be a lasing element such as gallium phosphide. The junctions may be made to the same depth as previously. The Brewster angle will be slightly different for these materials as the index of refraction is slightly different for these materials. However, as is well known in the art, a common Brewster angle may be calculated essentially satisfying both materials. This is so that while a particular Brewster angle may exist for a given material utilizing two indexes of refraction — the material and the medium into which a light passes — where three materials are involved, a common Brewster angle may also be evolved. This is not as efficient as using materials having only two different indices of refraction, but the effect will also be noted of enhancing one mode of polarization compared to the other. Consequently, the space between the two lasing elements may be air or a particular material, so long as the common Brewster angle is obtained. It is noted that gallium arsenide has a wavelength that is not absorbed by the gallium phosphide. Since gallium arsenide emits in the infrared wavelength and gallium phosphide in the visible wavelength, the pulsing of these two different elements results in polarization enhancement via the Brewster angle while simultaneously emitting an infrared wavelength beam and a visible light beam. Since the gallium phosphide light is absorbed by the gallium arsenide material, the gallium phosphide element must contain the face through which light is emitted. This visible light will not be as powerful as the light from the gallium arsenide portion of the sandwich, since it will not be laser light. However, since both wavelengths emerge from a common channel they have a common axis and the visible light can still be used as an alignment tool to aim the infrared light. The reinforcement effect is noted for other semiconducting materials for which both components emit light which is not absorbed by the other. In such cases, both wavelengths are polarized and both elements act as lasers. As before, various combinations of partially reflecting surfaces may be utilized, common channels may be utilized, or the entire devices may be void of channels in effect being a single channel device.

In essence then, this device comprises a junction laser having preferred polarizing enhancement comprising at least first and second lasing elements of substantially the same index of refraction and spaced from each other and inclined at a common Brewster angle with respect to the Fabry-Perot axis of the resonator. The non-common external faces of the element are inclined parallel to each other to form a Fabry-Perot resonator. Further, attached to the device are means for applying current to the lasing elements to cause light generation. The lasing elements may be of the same composition, and preferably would be chosen from the group consisting of gallium arsenide, gallium phosphide, and gallium aluminum arsenide. Other materials of course, are known to those skilled in the art. Alternatively the first and second lasing elements may be of different composition. In that case, one ideal composition would be to have one lasing element of gallium arsenide and the second of gallium phosphide, whereas the full element is substantially transparent to the light wavelength generated by the second element.

The first and second lasing elements may be physically distinct and separated from its facing means, as shown in FIG. 1. An easy way of placing the spacing means on the devices is by vacuum evaporation. This allows accurate control of the thickness between the elements. Other spacing means are known in the arts. Alternatively, the first and second lasing elements may share a common base, as illustrated in FIG. 2. The current applying means may also be designed to independently supply current to each of the lasing elements, or may apply it to both, in a synchronous manner.

The spacing between the elements may be utilized by a Q-spoiler material, resulting in increased power outputs as a Q-switch function. The emitted beam is nonetheless a polarized beam. Mirrors may be utilized to direct the beams in a particular way. Similarly, a plurality of lasing junctions separated by dielectric regions, such as shown in FIG. 1 where lasing regions 2 are separated by dielectric regions 13, may be utilized to have a multi-lasing output. Further, additional lasing elements may be utilized to have a succession of Brewster angle surfaces, so long as the final surfaces terminate in parallel surfaces so as to ultimately form the Fabry-Perot resonator. Utilizing two laser elements is sufficient for most applications, but those skilled in the art will best be able to determine whether additional layers of devices separated by Brewster angles will be desirable.

The device is easy to manufacture. In effect, one need only incline a first and second lasing element having substantially the same index of refraction at a common Brewster angle, spaced apart at a distance that permits the Brewster angle effect to occur when lasing action occurs, and aligning the non-common faces of the lasing elements parallel to each other to form the Fabry-Perot resonator. The Brewster angle cut may be formed as described previously by saw cutting, laser machining, electron beam machining, or polishing.

A particular application for a laser of this type, particularly where the multi-channel device is utilized, is in the data storage area. Thus, in a process for reading data comprising the steps of directing a polarized light beam upon a medium that exerts a polarization rotational effect and then determining the rotation of the plane of polarization of the beam from the medium to indicate the state of the surface addressed, this device comprises a marked improvement in the generating of a polarized light beam. In particular, a beam addressable file may be utilized in which a magnetic surface is addressed by a polarized light beam, and a Faraday rotation occurs in transmission or a Kerr rotation in reflection from that surface, indicating the magnetic state of that surface. Generally, a polarized beam may also be directed to a ferro-electric medium and the rotation occurring determines the direction or state of charge of that region. Further, other devices may be utilized in which a simple passage of a polarized beam through the medium causes rotation of the beam as a function of the thickness of the medium, as a data storage medium. Consequently, the multi-channel fine beam junction laser of this invention is utilizable for such a device as well.

In essence then, what has been disclosed is a device for and a process for generating a light beam from a junction laser, with the improvement over the prior art being the generating of a light beam having a preferred polarized enhancement by directing the light beams generating by at least first and second lasing elements across a common Brewster angle surface separating the lasing elemnts while maintaining the external non-common faces of the lasing elements parallel to each other to form a Fabry-Perot resonator.

While this device has been particularly described in terms for simplicity of gallium arsenide devices, junction lasers of many varieties exist and are known in the art. Many types of Q-switches are known in the art as well as many types of mirroring materials. Many means exist for cutting or slicing or otherwise working with gallium arsenide to form a cut in the device or forming spacing means. Thus, other embodiments may be made utilizing the basic concepts of this invention. Thus, by this invention it is possible to obtain a polarized beam directly from a junction laser. Specifically, gallium arsenide, gallium phosphide and gallium aluminum arsenide may be utilized. The device has economic attractiveness as no external polarizing devices are necessary. Q-switching is an option while maintaining the polarized pulse. The device utilizes a very small space and offers multichannel effect if desired, all having a common polarization plane, if desirable for data storage devices.

What is claimed is:

1. A junction laser having preferred plane polarizing enhancement comprising:
   at least first and second lasing elements of substantially the same index of refraction having adjacent faces spaced from each other by at least one wavelength of the generated light and being substantially parallel and inclined at a common Brewster angle with respect to the path of a ray of light through the junction plane, with the non-common external faces of the elements inclined parallel to each other to form a Fabry-Perot resonator, and
   means for applying current to the lasing elements to cause light generation.

2. The junction laser of claim 1 wherein the first and second lasing elements are of the same composition.

3. The junction laser of claim 2 wherein the first and second lasing elements are of the same composition and are chosen from the group consisting of GaAs, GaP, and GaAlAs.

4. The junction laser of claim 1 wherein the first and second lasing elements are of different composition.

5. The junction laser of claim 1 wherein the first and second lasing elements are of different composition and at least the first lasing element is substantially transparent to the light wavelength generated by the second lasing element.

6. The junction laser of claim 1 wherein the first and second lasing elements are of different composition and the first lasing element is substantially transparent to the light wavelength generated by the second lasing element and the second lasing element is substantially transparent to the light wavelength generated by the first lasing element.

7. The junction laser of claim 1 wherein the first lasing element is GaP and the second lasing element is GaAs.

8. The junction laser of claim 1 wherein the first and second lasing elements are physically distinct and separated by a spacing means.

9. The junction laser of claim 1 wherein the first and second lasing elements share a common base.

10. The junction laser of claim 1 wherein the means for applying current comprises means for independently applying current to each of the lasing elements.

11. The junction laser of claim 1 wherein the means for applying current comprises means for applying current to the lasing elements in a synchronous manner.

12. The junction laser of claim 1 wherein the lasing elements are spaced from each other by a Q-spoiler material.

13. The junction laser of claim 1 wherein at least one of the non-common resonator parallel faces of the lasing elements has a mirrored surface.

14. The junction laser of claim 1 wherein the non-common resonator faces of the lasing elements have mirrored surfaces.

15. The junction laser of claim 1 wherein at least one of the lasing elements comprises a plurality of lasing junctions separated from each other by a dielectric region.

16. The junction laser of claim 1 wherein the lasing elements comprise a plurality of lasing junctions separated from each other by a dielectric region, and the lasing elements are aligned to reinforce each other across the Brewster angle space.

17. A method of making a junction laser having preferred plane polarizing enhancement comprising the steps of:
    aligning at least first and second lasing elements of substantially the same index of refraction with the adjacent faces being substantially parallel and inclined at a common Brewster angle with respect to the path of a ray of light through the junction plane;
    spacing the first and second lasing elements at the Brewster angle faces a distance at least that to permit the Brewster angle effect to occur when the lasing elements are activated;
    aligning the non-common faces of the lasing elements parallel to each other to form a Fabry-Perot resonator; and
    applying current conducting means to the lasing elements.

18. The method of claim 17 including the step of forming the first and second lasing elements by forming a Brewster angle space through the lasing junctions and leaving a common base between the elements.

19. The method of claim 18 wherein the Brewster angle space is formed by saw-cutting.

20. The method of claim 18 wherein the Brewster angle space is formed by laser beam machining.

21. The method of claim 18 wherein the Brewster angle cut is formed by electron beam machining.

22. In a process for reading data comprising the steps of directing a polarized light beam upon a medium exerting a polarization rotational effect and determining the rotation of the plane of polarization of the light beam from the medium to indicate the states of the surface addressed, the improvement comprising a junction laser having preferred plane polarizing enhancement to generate the polarized light beam comprising:
    at least first and second lasing elements of substantially the same index of refraction having adjacent faces spaced from each other by at least one wavelength of the generated light through the junction plane, with the non-common external faces of the elements inclined parallel to each other to form a Fabry-Perot resonator, and
    means for applying current to the lasing elements to cause light generation.

23. In a process for generating a light beam from a junction laser, the improvement of generating a light beam having a preferred plane polarizing enhancement comprising the step of:
    directing the light beams generated by at least first and second lasing elements of substantially the same index of refraction across adjacent faces spaced from each other by at least one wavelength of the generated light and being substantially parallel and inclined at a common Brewster angle surface separating the lasing elements with respect to the path of the light beams through the junction plane, while maintaining the external non-common faces of the lasing elements parallel to form a Fabry-Perot resonator.

24. In a process for reading data comprising the steps of directing a polarized light beam upon a medium exerting a polarization rotational effect and determining the rotation of the plane of polarization of the light beam from the medium to indicate the state of the surface addressed, the improvement comprising generating the polarized beam from a junction laser having preferred polarizing enhancement by the step of:

directing the light beams generated by at least first and second lasing elements of substantially the same index of refraction across adjacent faces spaced from each other by at least one wavelength of the generated light and being substantially parallel and inclined at a common Brewster angle surface separating the lasing elements with respect to the path of the light beams through the junction plane, while maintaining the external non-common faces of the lasing elements parallel to form a Fabry-Perot resonator.

* * * * *